(12) United States Patent
Muramatsu (10) Patent No.: US 10,520,030 B2
(45) Date of Patent: Dec. 31, 2019

(54) STRUCTURE WITH BEARING AND BEARING

(71) Applicant: Honda Motor Co., Ltd., Tokyo (JP)

(72) Inventor: Isamu Muramatsu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 76 days.

(21) Appl. No.: 15/913,935

(22) Filed: Mar. 7, 2018

(65) Prior Publication Data

US 2018/0266487 A1 Sep. 20, 2018

(30) Foreign Application Priority Data

Mar. 15, 2017 (JP) .................................. 2017-049602

(51) Int. Cl.
*F16C 33/66* (2006.01)
*F16H 57/04* (2010.01)
(Continued)

(52) U.S. Cl.
CPC ............ *F16C 33/664* (2013.01); *F16C 19/06* (2013.01); *F16C 33/586* (2013.01); *F16C 33/6651* (2013.01); *F16C 33/6685* (2013.01); *F16H 57/0428* (2013.01); *F16H 57/0457* (2013.01); *F16H 57/0471* (2013.01); *F16H 57/0484* (2013.01); *F16C 2326/06* (2013.01); *F16C 2361/65* (2013.01); *F16H 3/66* (2013.01);
(Continued)

(58) Field of Classification Search
CPC .. F16C 33/664; F16C 33/586; F16C 33/6651; F16C 33/6685; F16C 19/06; F16H 57/0457; F16H 57/0471; F16H 57/428; F16H 57/484; F16H 3/66
See application file for complete search history.

(56) References Cited

U.S. PATENT DOCUMENTS

| | | | | |
|---|---|---|---|---|
| 2015/0252852 | A1* | 9/2015 | Krause | F16C 33/664 384/465 |
| 2017/0314616 | A1* | 11/2017 | Noda | F16C 33/605 |
| 2018/0030854 | A1* | 2/2018 | Flouros | F01D 25/125 |

FOREIGN PATENT DOCUMENTS

| | | |
|---|---|---|
| JP | 63-231021 | 9/1988 |
| JP | H0632746 | 4/1994 |

(Continued)

OTHER PUBLICATIONS

"Office Action of Japan Counterpart Application," dated Mar. 26, 2019, with English translation thereof, p. 1-p. 6.
(Continued)

*Primary Examiner* — Mark J Beauchaine
(74) *Attorney, Agent, or Firm* — JCIPRNET (57) ABSTRACT

Provided is a structure with a bearing which is capable of suppressing abrasion of a first member and a first annular member of the bearing in contact with the first member even when relative movement occurs between the first member and the first annular member. The structure with a bearing supplies lubricating oil scraped up from an oil reservoir by an output member (12) to a bearing (20) disposed between a ring gear (Rb) and a transmission case (10). The ring gear (Rb) has a communication groove (30) which allows two spaces adjacent to the bearing (20) to communicate with each other in a portion which is in contact with the first annular member (21) located on an inner circumferential side of the bearing (20).

15 Claims, 6 Drawing Sheets

(51) Int. Cl.
*F16C 19/06* (2006.01)
*F16C 33/58* (2006.01)
*F16H 3/66* (2006.01)

(52) U.S. Cl.
CPC ............ *F16H 2200/0069* (2013.01); *F16H 2200/2012* (2013.01); *F16H 2200/2046* (2013.01); *F16H 2200/2048* (2013.01); *F16H 2200/2066* (2013.01); *F16H 2200/2082* (2013.01)

(56) References Cited

FOREIGN PATENT DOCUMENTS

| JP | 2000-283272 | 10/2000 |
| JP | 2009068586 | 4/2009 |
| JP | 2014-228134 | 12/2014 |
| JP | 2015072051 | 4/2015 |
| JP | 2016-114120 | 6/2016 |

OTHER PUBLICATIONS

"Office Action of Japan Counterpart Application," dated Sep. 4, 2018, with English translation thereof, p. 1-p. 5.

\* cited by examiner

| | C1 | C2 | C3 | B1 | B2 | B3 | F1 | Gear shift ratio | Common ratio |
|---|---|---|---|---|---|---|---|---|---|
| Rvs | | | ○ | | ○ | | L | 4.008 | |
| 1st | | | | ○ | (○) | | R/L | 5.233 | 1.554 |
| 2nd | | ○ | | ○ | ○ | | R | 3.367 | 1.465 |
| 3rd | | | ○ | ○ | ○ | | R | 2.298 | 1.348 |
| 4th | | ○ | ○ | ○ | | | R | 1.705 | 1.251 |
| 5th | ○ | | (○) | ○ | | | R | 1.363 | 1.363 |
| 6th | ○ | ○ | ○ | | | | R | 1.000 | 1.273 |
| 7th | ○ | | ○ | | ○ | | R | 0.786 | 1.196 |
| 8th | ○ | ○ | | | ○ | | R | 0.657 | 1.126 |
| 9th | ○ | | | | ○ | ○ | R | 0.584 | 1.120 |
| 10th | ○ | ○ | | | | ○ | R | 0.520 | |

STRUCTURE WITH BEARING AND BEARING

CROSS-REFERENCE TO RELATED APPLICATION

This disclosure claims the priority benefit of Japan application serial no. 2017-049602, filed on Mar. 15, 2017. The entirety of the above-mentioned patent application is hereby incorporated by reference herein and made a part of this specification.

BACKGROUND

Technical Field

The present disclosure relates to a bearing disposed between two members, and a structure with a bearing which includes the two members and the bearing disposed therebetween.

Description of Related Art

Conventionally, there is known a structure including a first member and a second member (for example, an output shaft and a transmission case) which are relatively rotatable, and an annular bearing which is disposed between the first member and the second member (for example, refer to Patent Document 1).

A bearing of such a type generally includes a first annular member which is in contact with the first member, a second annular member which is in contact with the second member, and a rolling body disposed between the first annular member and the second annular member, and the first member and the first annular member, and the second member and the second annular member rotate integrally respectively.

[Patent Document 1] Japanese Unexamined Patent Application Publication No. 2014-228134

However, in the conventional structure with a radial bearing as described in Patent Document 1, when a large force is applied to the first member, relative movement (for example, relative rotation, axial deviation, relative movement in an axial direction) may occur in the first member and the first annular member which rotate integrally in a normal state. When such relative movement occurs, abrasion may occur in the first member and the first annular member.

SUMMARY

The present disclosure has been made in view of the above problems, and an object of the present disclosure is to provide a structure with a bearing which is capable of suppressing abrasion of a first member and a first annular member of the bearing in contact with the first member even when relative movement occurs between the first member and the first annular member, and a bearing.

To achieve the above object, a structure with a bearing of the present disclosure is a structure with a bearing, which has a first member (for example, an output member 12 in the embodiment, hereinafter, it is the same) and a second member (for example, a transmission case 10 in the embodiment, hereinafter, it is the same) which are relatively rotatable, and an annular bearing (for example, a bearing 20 in the embodiment, hereinafter, it is the same) disposed between the first member and the second member, wherein the bearing is a member to which a lubricating fluid is supplied and includes a first annular member (for example, a first annular member 21 in the embodiment, hereinafter, it is the same) which is in contact with the first member, a second annular member (for example, a second annular member 22 in the embodiment, hereinafter, it is the same) which is in contact with the second member, and a rolling body (for example, a rolling body 23 in the embodiment, hereinafter, it is the same) disposed between the first annular member and the second annular member, and one of the first member and the first annular member has a communication groove (for example, a communication groove 30 in the embodiment, hereinafter, it is the same) configured to communicate two spaces adjacent to both ends of the first annular member at a portion thereof in contact with the other.

Further, in the structure with a bearing of the disclosure, the bearing may be a radial bearing, and the communication groove may be inclined with respect to a rotational central axial line of the first annular member. Further, in the structure with a bearing of the disclosure, the bearing is the radial bearing, and when the communication groove is inclined, the communication groove may be a spiral groove configured to extend around the rotational central axial line of the first annular member.

Further, in the structure with a bearing of the disclosure, the first member may have a first member side flow guiding groove (for example, an annular groove 31 in the embodiment. Hereinafter, it is the same) configured to communicate with the communication groove in a portion corresponding to an edge portion of at least one of both end portions of the bearing.

Further, a shape of the first member side flow guiding groove may be a shape (for example, a semicircular shape) provided in a certain range of a circumferential surface, in addition to an annular shape which surrounds the circumferential surface and may be a concave shape such as a recess formed in the circumferential surface.

Further, in the structure with a bearing of the disclosure, a bearing side flow guiding groove (for example, a flow guiding groove 21a in the embodiment. Hereinafter, it is the same) configured to communicate with the communication groove may be formed in at least one of both end surfaces of the first annular member of the bearing.

Further, in the structure with a bearing of the disclosure, the first member may have a wall portion (for example, a protruding portion 12c in the embodiment. Hereinafter, it is the same) configured to protrude along an end surface of the bearing at a position spaced apart from the bearing.

Further, in the structure with a bearing of the disclosure, the first member may have a gear (for example, a tooth portion 12b and a protruding portion 12c in the embodiment. Hereinafter, it is the same) adjacent to the bearing, the second member may have a receiving surface (for example, a ceiling portion 10a in the embodiment. Hereinafter, it is the same) configured to receive the lubricating fluid scattered by rotation of the gear, and the receiving surface may have a stepped portion (for example, a stepped portion 10b in the embodiment. Hereinafter, it is the same) configured to protrude to guide the received lubricating fluid to a space between the gear and the bearing.

Further, a bearing of the disclosure is a bearing disposed between a first member and a second member which are relatively rotatable including a first annular member which is in contact with the first member, a second annular member which is in contact with the second member, and a rolling body disposed between the first annular member and the second annular member, wherein the first annular member has a communication groove configured to communicate two spaces adjacent to both ends of the first annular member at a portion thereof in contact with the first member.

Further, in bearing of the disclosure, the communication groove may be inclined with respect to a rotational central axial line of the first annular member. Furthermore, in bearing of the disclosure, when the communication groove is inclined, the communication groove may be a spiral groove configured to extend around the rotational central axial line of the first annular member.

Further, in bearing of the disclosure, a bearing side flow guiding groove extending radially may be formed in at least one of both end surfaces of the first annular member of the bearing.

DESCRIPTION OF THE EMBODIMENTS

As described above, in the structure with a bearing of the disclosure, the communication groove is provided at the portion in which the first member and the first annular member of the bearing are in contact with each other, and the two spaces adjacent to both ends of the first annular member communicates with each other by the communication groove. Therefore, some of the lubricating fluid supplied to the bearing is also supplied between the first member and the first annular member, which are in contact with each other, through the communication groove.

Therefore, according to the structure with a bearing, even when relative movement between the first member and the first annular member occurs, a lubricating action by the lubricating fluid can act on the portion in which the first member and the first annular member are in contact with each other, and thus abrasion in that portion is suppressed.

As described above, when the communication groove is an inclined groove (for example, the spiral groove), a length of the communication groove is longer than in a case in which the communication groove is formed as a groove in parallel with the rotational central axial line of the first annular member, and thus an amount of the lubricating fluid held between the first member and the first annular member can be increased. Therefore, it is easier to suppress abrasion between the first member and the first annular member of the bearing in contact with the first member.

Further, when such a first member side flow guiding groove is formed, the supplied lubricating fluid is accumulated in the first member side flow guiding groove (that is, an entrance portion of the communication groove), and thus it is possible to efficiently guide the lubricating fluid to the communication groove. Therefore, since sufficient lubricating fluid is supplied to the communication groove, the abrasion between the first member and the first annular member of the bearing in contact therewith can be easily suppressed.

Further, when the bearing side flow guiding groove is formed, the lubricating fluid supplied to the end surface of the first annular member of the bearing is guided to the communication groove via the bearing side flow guiding groove, and thus it is possible to efficiently guide the lubricating fluid to the communication groove. Therefore, since the sufficient lubricating fluid is supplied to the communication groove, the abrasion between the first member and the first member of the bearing in contact therewith can be easily suppressed.

Further, when the wall portion is provided, a groove-shaped space which communicates with the communication groove and capable of accumulating the lubricating fluid is formed between the bearing and the wall portion. Therefore, since it is possible to stably supply the lubricating fluid to the communication groove, the abrasion between the first member and the first annular member of the bearing in contact therewith can be more easily suppressed.

Further, when the stepped portion is provided, the lubricating fluid supplied to the gear for lubrication is scattered by the rotation of the gear, and at least some of the scattered lubricating fluid is guided to a space between the gear and the bearing to return back by the stepped portion of the second member. The lubricating fluid guided between the gear and the bearing efficiently flows to a contact portion between the first member and the bearing. Therefore, since the sufficient lubricating fluid is supplied to the communication groove, the abrasion between the first member and the first annular member of the bearing in contact therewith can be easily suppressed.

Therefore, according to the bearing of the disclosure, since the communication groove is provided in the portion which is in contact with the first member, when the bearing is brought into contact with the first member which is in contact with the bearing, the two spaces adjacent to both ends of the first annular member communicate with each other by the communication groove. Therefore, when the lubricating fluid is supplied in that state, the lubricating fluid is also supplied between the first member and the first annular member which are in contact with each other via the communication groove.

Therefore, according to the bearing of the disclosure, even when the relative movement between the first member in contact with the first annular member and the first annular member occurs, the lubricating action by the lubricating fluid can act on the portion in which the first member and the first annular member are in contact with each other, and thus the abrasion in that portion is suppressed.

As described above, when the communication groove is an inclined groove (for example, the spiral groove), a length of the communication groove is longer than in a case in which the communication groove is formed as a groove in parallel with the rotational central axial line of the first annular member, and thus an amount of the lubricating fluid held between the first member and the first annular member can be increased. Therefore, it is easier to suppress the abrasion between the first annular member of the bearing in contact with the first member and the first member.

Further, when the bearing side flow guiding groove is formed, the lubricating fluid supplied to the end surface of the first annular member of the bearing is guided to the communication groove via the bearing side flow guiding groove, and thus it is possible to efficiently guide the lubricating fluid to the communication groove. Therefore, since the sufficient lubricating fluid is supplied to the communication groove, the abrasion between the first member and the first member of the bearing in contact therewith can be easily suppressed.

Hereinafter, a vehicle in which a transmission having a structure with a bearing according to an embodiment is mounted will be described with reference to the drawings.

Figure 1:
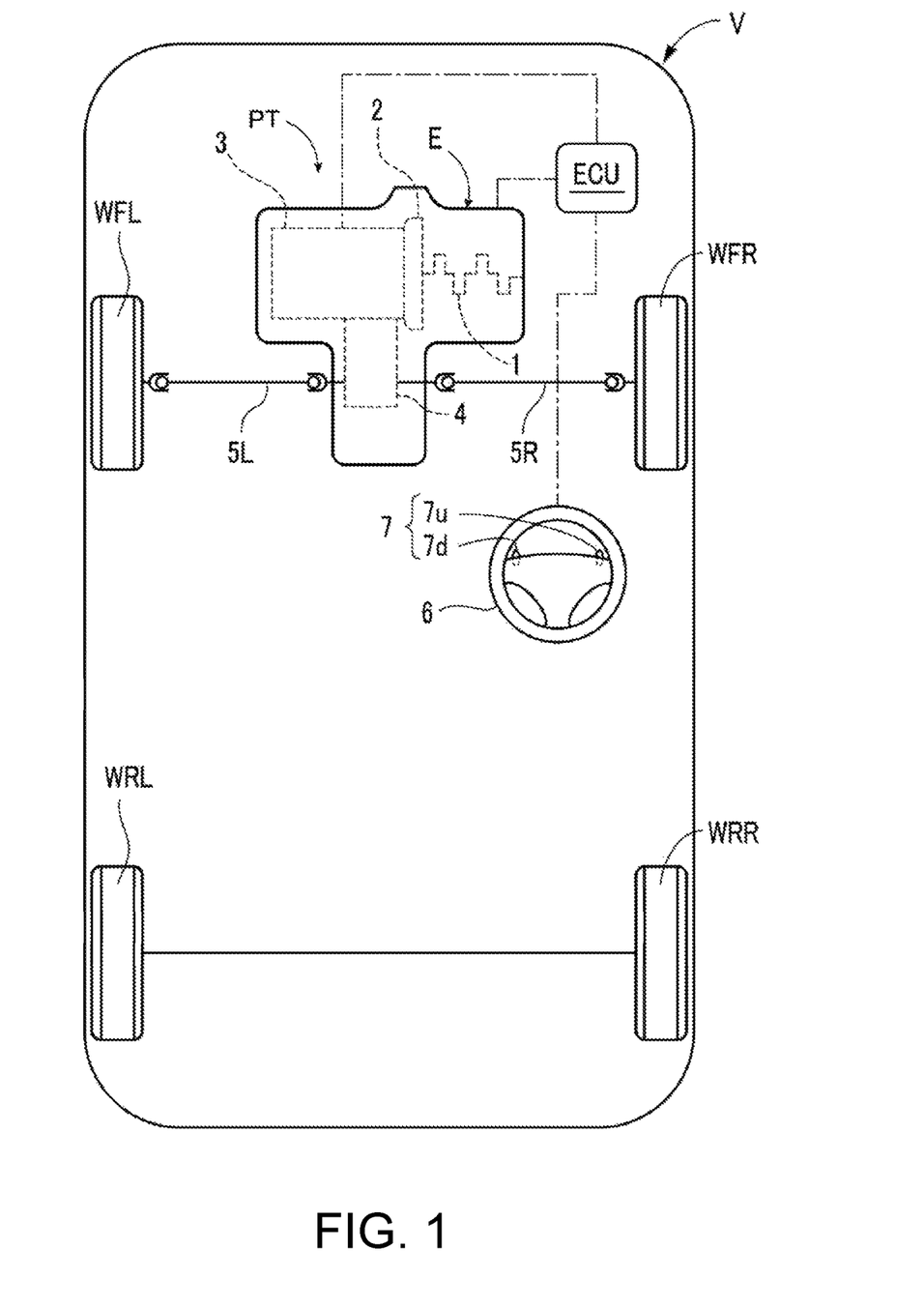
FIG. 1 is an explanatory view schematically illustrating a vehicle including a structure with a radial bearing according to an embodiment.

As illustrated in FIG. 1, in a vehicle V, an engine E (for example, an internal combustion engine, or a driving source, alternatively, an electric motor may be used in place of the engine E) is mounted sideways in a vehicle body so that a crankshaft 1 is directed in a vehicle body leftward/rightward direction. A driving force output from the engine E is transmitted to a power transmission device PT. Then, the power transmission device PT adjusts the driving force of the engine E in accordance with a selected gear shift ratio and transmits the adjusted driving force to a left front wheel WFL and a right front wheel WFR.

The power transmission device PT includes an automatic transmission 3 having a torque converter 2 connected to the crankshaft 1 and a front differential gear 4 connected to the automatic transmission 3. The front differential gear 4 is connected to the left front wheel WFL and the right front wheel WFR via a front left axle 5L and a front right axle 5R.

Figure 2:
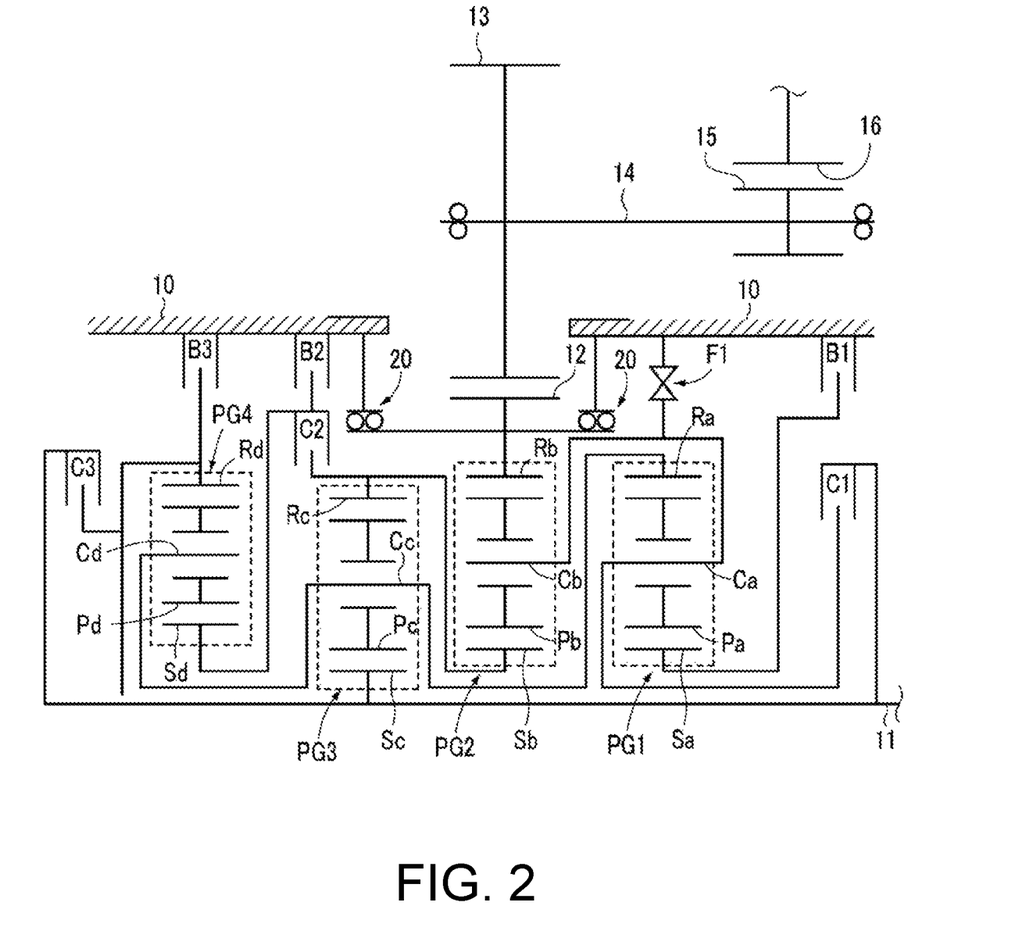
FIG. 2 is a skeleton diagram illustrating a transmission mounted in the vehicle of FIG. 1.

FIG. 2 is a skeleton diagram illustrating a part of the automatic transmission 3 excluding the torque converter 2. The automatic transmission 3 includes an input shaft 11 as an input member pivotally supported inside a transmission case 10 as a casing to be rotatable, and an output member 12 which is an output gear disposed concentrically with the input shaft 11.

The driving force output from the engine E is transmitted to the input shaft 11 via the torque converter 2 having a lock-up clutch and a damper.

Rotation of the output member 12 is transmitted to the left and right driven wheels (the left front wheel WFL and the right front wheel WFR) of the vehicle via an idle gear 13 engaged with the output member 12, an idle shaft 14 which pivotally supports the idle gear 13, a final drive gear 15 pivotally supported by the idle shaft 14, and a final driven gear 16 provided at the front differential gear 4 and engaged with the final drive gear 15.

Further, in the power transmission device PT, a single plate type or multiple plate type starting clutch configured to be frictionally engageable may be provided in place of the torque converter 2. Furthermore, when a propeller shaft instead of the front differential gear 4 is connected, the power transmission device PT may also be applied to a rear wheel drive vehicle in which a left rear wheel WRL and a right rear wheel WRR are driven. Also, the power transmission device PT may also be applied to a four-wheel drive vehicle by connecting a propeller shaft to the front differential gear 4 via a transfer.

A first planetary gear mechanism PG1, a second planetary gear mechanism PG2, a third planetary gear mechanism PG3 and a fourth planetary gear mechanism PG4 are disposed concentrically with the input shaft 11 in this order from the engine E side inside the transmission case 10 as the casing of the automatic transmission 3.

The third planetary gear mechanism PG3 is configured as a so-called single pinion type planetary gear mechanism having a sun gear Sc, a ring gear Rc, and a carrier Cc pivotally supporting a pillion Pc, which is engaged with the sun gear Sc and the ring gear Rc, rotatably and revolvingly.

In a so-called single pinion type planetary gear mechanism, when the carrier is fixed and the sun gear is rotated, the ring gear rotates in a direction different from that of the sun gear, and thus the so-called single pinion type planetary gear mechanism is also referred to as a minus planetary gear mechanism or a negative planetary gear mechanism. Also, in a so-called single pinion type planetary gear mechanism, when the ring gear is fixed and the sun gear is rotated, the carrier rotates in the same direction as that of the sun gear.

Figure 3:
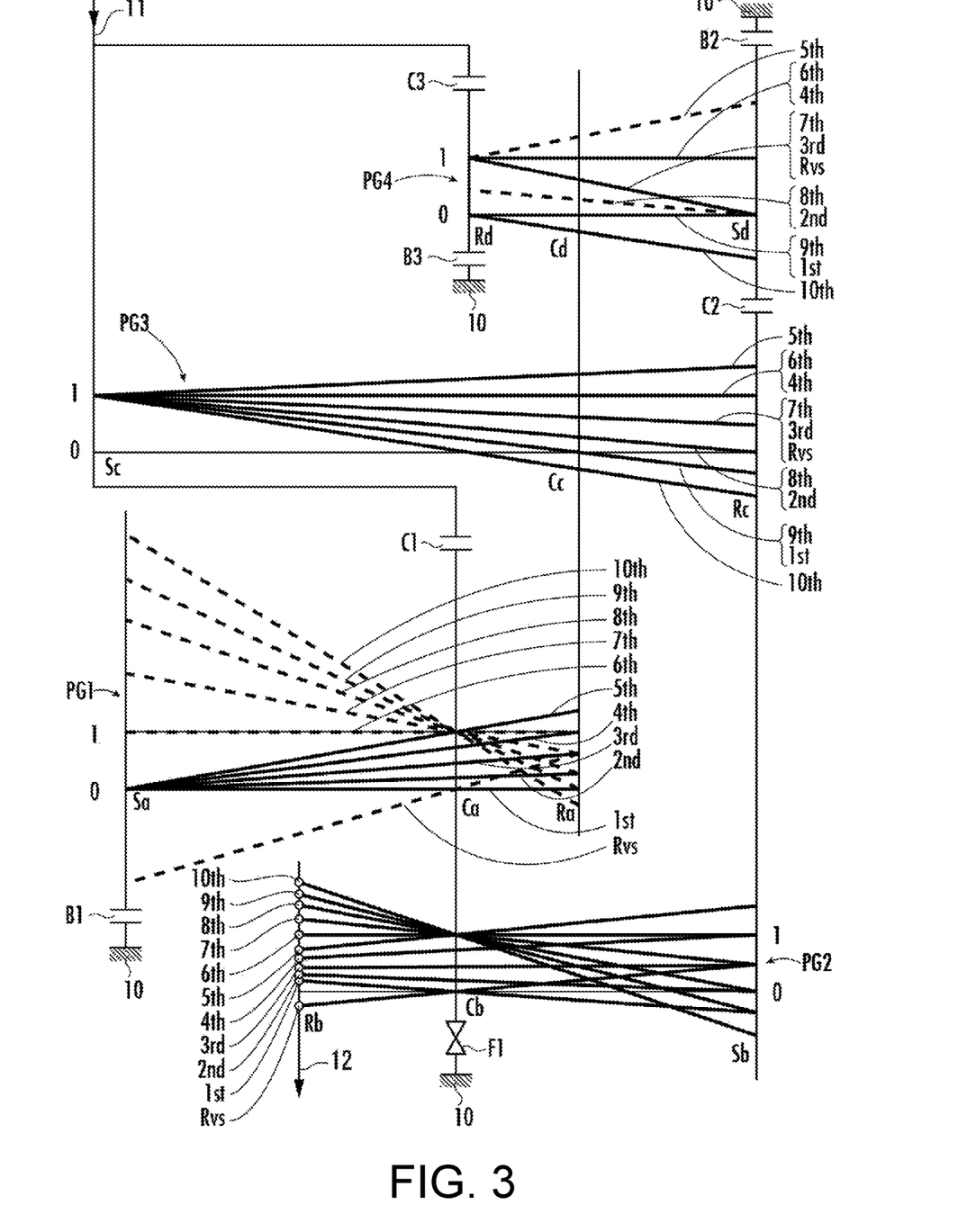
FIG. 3 is an alignment chart of a planetary gear mechanism of the transmission of FIG. 2.

An alignment chart (a diagram in which ratios between relative rotational speeds of three elements including the sun gear, the carrier and the ring gear can be expressed by a straight line (speed line)) illustrated in a second part from the top in FIG. 3 is an alignment chart of the third planetary gear mechanism PG3. As illustrated in the alignment chart, when it is assumed that the sun gear Sc, the carrier Cc and the ring gear Rc which are three elements of the third planetary gear mechanism PG3 are a first element, a second element and a third element from a left side in an arrangement order at intervals corresponding to a gear ratio (the number of teeth of the ring gear/the number of teeth of the sun gear) in the alignment chart, the first element is the sun gear Sc, the second element is the carrier Cc, and the third element is the ring gear Re.

Here, a ratio between a distance from the sun gear Sc to the carrier Cc and a distance from the carrier Cc to the ring gear Rc is set to h:1, wherein h is the gear ratio of the third planetary gear mechanism PG3. Also, in the alignment chart, a lower horizontal line and an upper horizontal line (lines overlapping 4th and 6th) indicate that the rotational speeds are "0" and "1" (the same rotational speed as that of the input shaft 11).

The fourth planetary gear mechanism PG4 is also configured as a so-called single pinion type planetary gear mechanism having a sun gear Sd, a ring gear Rd, and a carrier Cd pivotally supporting a pinion Pd, which is engaged with the sun gear Sd and the ring gear Rd, rotatably and revolvingly.

An alignment chart illustrated in a first part (uppermost part) from the top in FIG. 3 is an alignment chart of the fourth planetary gear mechanism PG4. As illustrated in the alignment chart, when it is assumed that the sun gear Sd, the carrier Cd and the ring gear Rd which are three elements of the fourth planetary gear mechanism PG4 are a fourth element, a fifth element and a sixth element from a left side in an arrangement order at intervals corresponding to a gear ratio in the alignment chart, the fourth element is the ring gear Rd, the fifth element is the carrier Cd, and the sixth element is the sun gear Sd.

Here, a ratio between a distance from the sun gear Sd to the carrier Cd and a distance from the carrier Cd to the ring gear Rd is set to i:1, wherein i is the gear ratio of the fourth planetary gear mechanism PG4.

The first planetary gear mechanism PG1 is also configured as a so-called single pinion type planetary gear mechanism having a sun gear Sa, a ring gear Ra, and a carrier Ca pivotally supporting a pinion Pa, which is engaged with the sun gear Sa and the ring gear Ra, rotatably and revolvingly.

An alignment chart illustrated in a third part from the top in FIG. 3 is an alignment chart of the first planetary gear mechanism PG1. As illustrated in the alignment chart, when it is assumed that the sun gear Sa, the carrier Ca and the ring gear Ra which are three elements of the first planetary gear mechanism PG1 are a seventh element, an eighth element and a ninth element from a left side in an arrangement order at intervals corresponding to a gear ratio in the alignment chart, the seventh element is the sun gear Sa, the eighth element is the carrier Ca, and the ninth element is the ring gear Ra.

Here, a ratio of a distance from the sun gear Sa to the carrier Ca and a distance from the carrier Ca to the ring gear Ra is set to j:1, wherein j is the gear ratio of the first planetary gear mechanism PG1.

The second planetary gear mechanism PG2 is also configured as a so-called single pinion type planetary gear mechanism having a sun gear Sb, a ring gear Rh, and a carrier Cb pivotally supporting a pinion Pb, which is engaged with the sun gear Sb and the ring gear Rb, rotatably and revolvingly.

An alignment chart illustrated in a fourth part (lowermost part) from the top in FIG. 3 is an alignment chart of the second planetary gear mechanism PG2. As illustrated in the alignment chart, when it is assumed that the sun gear Sb, the carrier Cb and the ring gear Rb which are three elements of the second planetary gear mechanism PG2 are a tenth element, an eleventh element and a twelfth element from a left side in an arrangement order at intervals corresponding to a gear ratio in the alignment chart, the tenth element is the ring gear Rb, the eleventh element is the carrier Cb, and the twelfth element is the sun gear SU.

Here, a ratio of a distance from the sun gear SU to the carrier Cb and a distance from the carrier Cb to the ring gear Rb is set to k:1, wherein k is the gear ratio of the second planetary gear mechanism PG2.

The sun gear Sc (first element) of the third planetary gear mechanism PG3 is connected to the input shaft 11. Further, the ring gear Rb (tenth element) of the second planetary gear mechanism PG2 is connected to the output member 12 configured as the output gear.

Also, the carrier Cc (second element) of the third planetary gear mechanism PG3, the carrier Cd (fifth element) of the fourth planetary gear mechanism PG4 and the ring gear Ra (ninth element) of the first planetary gear mechanism PG1 are connected to each other, and a first connected body Cc-Cd-Ra is formed.

Also, the ring gear Rc (third element) of the third planetary gear mechanism PG3 and the sun gear Sb (twelfth element) of the second planetary gear mechanism PG2 are connected to each other, and a second connected body Rc-Sb is formed.

Also, the carrier Ca (eighth element) of the first planetary gear mechanism PG1 and the carrier Cb (eleventh element) of the second planetary gear mechanism PG2 are connected to each other, and a third connected body Ca-Cb is formed.

Further, the automatic transmission 3 has seven engagement mechanisms which includes three clutches which are a first clutch C1, a second clutch C2 and a third clutch C3, and three brakes which are a first brake B1, a second brake B2 and a third brake B3, and one two-way clutch F1.

The first clutch C1 is a hydraulically actuated wet multiple disk clutch. Due to the first clutch C1, the third planetary gear mechanism PG3 is configured to be switchable between a connected state in which the sun gear Sc (first element) and the third connected body Ca-Cb are connected and an open state in which the connection is disconnected.

The third clutch C3 is a hydraulically actuated wet multiple disk clutch. Due to the third clutch C3, the third planetary gear mechanism PG3 is configured to be switchable between a connected state in which the sun gear Sc (first element) and the ring gear Rd (fourth element) of the fourth planetary gear mechanism PG4 are connected and an open state in which the connection is disconnected.

The second clutch C2 is a hydraulically actuated wet multiple disk clutch. Due to the second clutch C2, the fourth planetary gear mechanism PG4 is configured to be switchable between a connected state in which the sun gear Sd (sixth element) and the second connected body Rc-Sb are connected and an open state in which the connection is disconnected.

The two-way clutch F1 also serves as a fourth brake B4. The two-way clutch F1 is configured to be switchable between a reverse rotation prevention state in which normal rotation (rotation in the same direction as a rotation direction of the input shaft 11 and the output member 12) of the third connected body Ca-Cb is allowed and reverse rotation is prevented and a fixed state in which the third connected body Ca-Cb is fixed to the transmission case 10.

In the reverse rotation prevention state, when a force intended to cause rotation in a normal rotation direction is applied to the third connected body Ca-Cb, rotation is allowed, and the two-way clutch F1 is brought into the open state. On the other hand, when a force intended to cause rotation in a reverse rotation direction is applied, rotation is blocked, and the two-way clutch F1 is brought into the fixed state in which the third connected body Ca-Cb is fixed to the transmission case 10.

The first brake B1 is a hydraulically actuated wet multiple disk brake. Due to the first brake B1, the first planetary gear mechanism PG1 is configured to be switchable between a fixed state in which the sun gear Sa (seventh element) is fixed to the transmission case 10 and an open state in which the fixed state is released.

The second brake B2 is a hydraulically actuated wet multiple disk brake. Due to the second brake B2, the fourth planetary gear mechanism PG4 is configured to be switchable between a fixed state in which the sun gear Sd (sixth element) is fixed to the transmission case 10 and an open state in which the fixed state is released.

The third brake B3 is a hydraulically actuated wet multiple disk brake. Due to the third brake B3, the fourth planetary gear mechanism PG4 is configured to be switchable between a fixed state in which the ring gear Rd (fourth element) is fixed to the transmission case 10 and an open state in which the fixed state is released.

The switching of the three clutches of the first clutch C1, the second clutch C2 and the third clutch C3, the three brakes of the first brake B1, the second brake B2 and the third brake B3, and one two-way clutch F1 is controlled by an electronic control unit (ECU) (refer to FIG. 1) including a transmission control unit (TCU) on the basis of vehicle information such as a traveling speed of a vehicle transmitted from an integrated control unit which is not illustrated.

The electronic control unit (ECU) includes an electronic unit composed of a CPU, a memory or the like which is not illustrated. The electronic control unit (ECU) receives predetermined vehicle information such as a traveling speed of the vehicle V or an opening degree of an accelerator, a rotational speed or an output torque of the engine E, operation information of a paddle shift lever 7, and so on and controls the automatic transmission 3 by executing a control program held in a storage device such as a memory by a CPU.

As illustrated in FIG. 1, the paddle shift lever 7 is provided on a handle 6 of the vehicle V, and the paddle shift lever 7 has a right paddle 7u and a left paddle 7d. When the right paddle 7u is pulled forward, upshifting is performed by a manual operation, and when the left paddle 7d is pulled forward, downshifting is performed by the manual operation. An operation signal of the paddle shift lever 7 is transmitted to the electronic control unit (ECU).

Further, an operational unit for a manual operation is not limited to a paddle shift lever. For example, a shift lever disposed between a driver's seat and a passenger's seat or a button disposed on the handle may be used as an operational unit.

As illustrated in FIG. 2, the first clutch C1, the first planetary gear mechanism PG1, the second planetary gear mechanism PG2, the third planetary gear mechanism PG3, the second clutch C2, the fourth planetary gear mechanism PG4 and the third clutch C3 are disposed on an axial line of the input shaft 11 in this order from the engine E and torque converter 2 side.

Additionally, the third brake B3 is disposed radially outward of the fourth planetary gear mechanism PG4, the second brake B2 is disposed radially outward of the second clutch C2, the first brake B1 is disposed radially outward of the first clutch C1, and the two-way clutch F1 is disposed radially outward of the first planetary gear mechanism PG1.

As described above, in the automatic transmission 3, the first brake B1, the second brake B2, the third brake B3 and the two-way clutch F1 are disposed radially outside of the planetary gear mechanism or the clutch. Therefore, an axial length of the automatic transmission 3 is shortened as compared with the case in which the first brake B1, the second brake B2, the third brake B3 and the two-way clutch F1 are disposed parallel to each other together with the planetary gear mechanism on the axial line of the input shaft 11.

Further, even if the third brake B3 is disposed radially outward of the third clutch C3 and the second brake B2 is disposed radially outward of the fourth planetary gear mechanism PG4, it is also possible to shorten the axial length.

Next, a case in which each gear shift stage of the automatic transmission 3 of the embodiment is established will be described with reference to FIG. 3 and FIG. 4.

Further, a speed line indicated by a broken line in FIG. 3 indicates that elements of other planetary gear mechanisms rotate (idle) by following a planetary gear mechanism which transmits power among the first planetary gear mechanism PG1, the second planetary gear mechanism PG2, the third planetary gear mechanism PG3 and the fourth planetary gear mechanism PG4.

Figure 4:
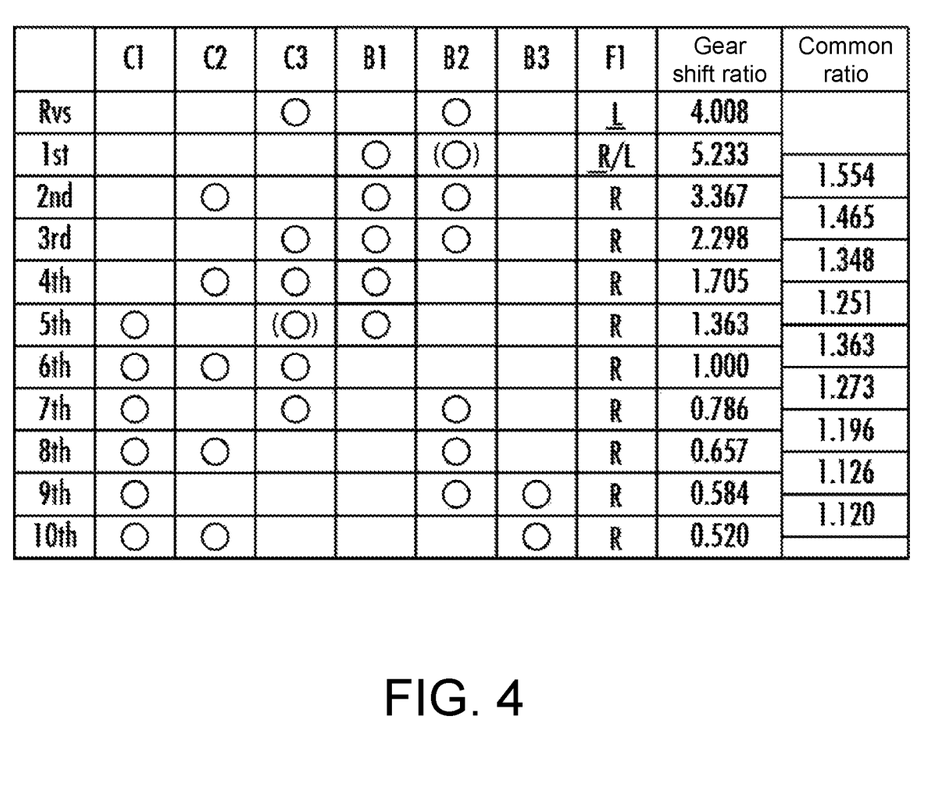
FIG. 4 is an explanatory view illustrating an engagement state of each engagement mechanism in each gear shift stage of the transmission of FIG. 2.

FIG. 4 is a diagram collectively illustrating states of the three clutches of the first clutch C1, the second clutch C2 and the third clutch C3, the three brakes of the first brake B1, the second brake B2 and the third brake B3, and one two-way clutch F1 in each gear shift stage which will be described later.

In this drawing, "O" in a row of each of the first clutch C1, the second clutch C2, the third clutch C3, the first brake B1, the second brake B2 and the third brake B3 indicates a connected state or a fixed state, and a blank indicates an open state. Also, "R" in a row of the two-way clutch F1 indicates a reverse rotation prevention state, and "L" indicates a fixed state.

Further, underlined "R" and "L" indicate that the rotational speed of the third connected body Ca-Cb becomes "0" due to an action of the two-way clutch F1. Also, "R/L" indicates a state that is a reverse rotation prevention state "R" normally but switched to a fixed state "L" when an engine brake is applied.

Further, FIG. 4 indicates a gear shift ratio (rotational speed of the input shaft 11/rotational speed of the output member 12) in each gear shift stage and a common ratio (a ratio of gear ratios between gear shift stages; a value obtained by dividing a gear shift ratio of a predetermined gear shift stage by a gear shift ratio of a gear shift stage that is one gear shift stage higher than the predetermined gear shift stage) in the case in which the gear ratio h of the third planetary gear mechanism PG3 is 2.734, the gear ratio i of the fourth planetary gear mechanism PG4 is 1.614, the gear ratio j of the first planetary gear mechanism PG1 is 2.681, and the gear ratio k of the second planetary gear mechanism PG2 is 1.914. Accordingly, it can be understood that common ratio can be appropriately set.

When a first gear stage is established, the two-way clutch F1 is brought into the reverse rotation prevention state (R in FIG. 4), and the first brake B1 and the second brake B2 are brought into the fixed state.

By setting the two-way clutch F1 to be in the reverse rotation prevention state R and setting the first brake B1 to be in the fixed state, the reverse rotation of the third connected body Ca-Cb and the sun gear Sa (seventh element) of the first planetary gear mechanism PG1 is prevented, and the rotational speed of the third connected body Ca-Cb and the sun gear Sa (seventh element) of the first planetary gear mechanism PG1 becomes "0".

Accordingly, the sun gear Sa (seventh element), the carrier Ca (eighth element), and the ring gear Ra (ninth element) of the first planetary gear mechanism PG1 are brought into a locked state in which relative rotation is impossible, and the rotational speed of the first connected body Cc-Cd-Ra including the ring gear Ra (ninth element) of the first planetary gear mechanism PG1 also becomes "0".

Then, the rotational speed of the ring gear Rb (tenth element) of the second planetary gear mechanism PG2 to which the output member 12 is connected becomes "1st" illustrated in FIG. 3, and the first gear stage is established.

Also, in order to establish the first gear stage, it is not necessary to set the second brake B2 in the fixed state. However, to smoothly shift from the first gear stage to a second gear stage which will be described later, the second brake B2 is fixed in the first gear stage. Further, when the engine brake is applied in the first gear stage, the two-way clutch F1 may be switched from the reverse rotation prevention state R to the fixed state L.

When the second gear stage is established, the two-way clutch F1 is set to be in the reverse rotation prevention state R, the first brake B1 and the second brake B2 are set to be in the fixed state, and the second clutch C2 is set to be in the connected state.

By setting the two-way clutch F1 to be the reverse rotation prevention state, normal rotation of the third connected body Ca-Cb is allowed. Further, by setting the first brake B1 to be the fixed state, the rotational speed of the sun gear Sa (seventh element) of the first planetary gear mechanism PG1 becomes "0". Furthermore, by setting the second brake B2 to be in the fixed state, the rotational speed of the sun gear Sd (sixth element) of the fourth planetary gear mechanism PG4 becomes "0".

Also, by setting the second clutch C2 to be in the connected state, the rotational speed of the second connected body Rc-Sb becomes "0" which is the same speed as the rotational speed of the sun gear Sd (sixth element) of the fourth planetary gear mechanism PG4.

Then, the rotational speed of the ring gear Rb (tenth element) of the second planetary gear mechanism PG2 to which the output member 12 is connected becomes "2nd" illustrated in FIG. 3, and the second gear stage is established.

When a third gear stage is established, the two-way clutch F1 is set to be in the reverse rotation prevention state, the first brake B1 and the second brake B2 are set to be in the fixed state, and the third clutch C3 is set to be the connected state.

By setting the two-way clutch F1 to be in the reverse rotation prevention state, normal rotation of the third connected body Ca-Cb is allowed. Further, by setting the first brake B1 to be in the fixed state, the rotational speed of the sun gear Sa (seventh element) of the first planetary gear mechanism PG1 becomes "0". Furthermore, by setting the second brake B2 to be in the fixed state, the rotational speed of the sun gear Sd (sixth element) of the fourth planetary gear mechanism PG4 becomes "0".

Also, by setting the third clutch C3 to be the connected state, the rotational speed of the ring gear Rd (fourth element) of the fourth planetary gear mechanism PG4 becomes "1" which is the same speed as the rotational speed of the sun gear Sc (first element) of the third planetary gear mechanism PG3 connected to the input shaft 11.

Accordingly, since the rotational speed of the sun gear Sd (sixth element) of the fourth planetary gear mechanism PG4 becomes "0" and the rotational speed of the ring gear Rd (fourth element) becomes "1", the rotational speed of the carrier Cd (fifth element), that is, the rotational speed of the first connected body Cc-Cd-Ra becomes $i/(i+1)$.

Additionally, the rotational speed of the ring gear Rb (tenth element) of the second planetary gear mechanism PG2 to which the output member 12 is connected becomes "3rd" illustrated in FIG. 3, and the third gear stage is established.

When a fourth gear stage is established, the two-way clutch F1 is set to be in the reverse rotation prevention state, the first brake B1 is set to be in the fixed state, and the second clutch C2 and the third clutch C3 are set to be in the connected state.

By setting the two-way clutch F1 to be in the reverse rotation prevention state, normal rotation of the third connected body Ca-Cb is allowed. Further, by setting the first brake B1 to be in the fixed state, the rotational speed of the sun gear Sa (seventh element) of the first planetary gear mechanism PG1 becomes "0".

Further, by setting the second clutch C2 to be in the connected state, the sun gear Sd (sixth element) of the fourth planetary gear mechanism PG4 and the second connected body Rc-Sb rotate at the same speed. Therefore, between the third planetary gear mechanism PG3 and the fourth planetary gear mechanism PG4, the carrier Cc (second element) and the carrier Cd (fifth element) are connected, and the ring gear Rc (third element) and the sun gear Sd (sixth element) are connected. Therefore, in the fourth gear stage in which the second clutch C2 is in the connected state, one alignment chart including four elements formed by the third planetary gear mechanism PG3 and the fourth planetary gear mechanism PG4 can be drawn.

Also, by setting the third clutch C3 to be in the connected state, the rotational speed of the ring gear Rd (fourth element) of the fourth planetary gear mechanism PG4 becomes "1" which is the same speed as the rotational speed of the sun gear Sc (first element) of the third planetary gear mechanism PG3, and the rotational speeds of two elements among the four elements formed by the third planetary gear mechanism PG3 and the fourth planetary gear mechanism PG4 become the same speed of "1".

Accordingly, each of the elements of the third planetary gear mechanism PG3 and the fourth planetary gear mechanism PG4 is in the locked state in which relative rotation is not possible, and the rotational speeds of all the elements of the third planetary gear mechanism PG3 and the fourth planetary gear mechanism PG4 become 1. Further, the rotational speed of the third connected body Ca-Cb becomes $j/(j+1)$.

Additionally, the rotational speed of the ring gear Rb (tenth element) of the second planetary gear mechanism PG2 to which the output member 12 is connected becomes "4th" illustrated in FIG. 3, and the fourth gear stage is established.

When a fifth gear stage is established, the two-way clutch F1 is set to be in the reverse rotation prevention state, the first brake B1 is set to be in the fixed state, and the first clutch C1 and the third clutch C3 are set to be in the connected state.

By setting the two-way clutch F1 to be in the reverse rotation prevention state, normal rotation of the third connected body Ca-Cb is allowed. Further, by setting the first brake B1 to be in the fixed state, the rotational speed of the sun gear Sa (seventh element) of the first planetary gear mechanism PG1 becomes "0".

Further, by setting the first clutch C1 to be in the connected state, the rotational speed of the third connected body Ca-Cb becomes "1" which is the same speed as the rotational speed of the sun gear Sc (first element) of the third planetary gear mechanism PG3.

Additionally, the rotational speed of the ring gear Rb (tenth element) of the second planetary gear mechanism PG2 to which the output member 12 is connected becomes "5th" illustrated in FIG. 3, and the fifth gear stage is established.

Also, to establish the fifth gear stage, it is not necessary to set the third clutch C3 to be in the connected state. However, in the fourth gear stage and a sixth gear stage which will be described later, it is necessary to set the third clutch C3 in the connected state, and thus the fifth gear stage is also set to be in the connected state such that downshifting from the fifth gear stage to the fourth gear stage and upshifting from the fifth gear stage to the sixth gear stage which will be described later can be performed smoothly.

When the sixth gear stage is established, the two-way clutch F1 is set to be in the reverse rotation prevention state R, and the first clutch C1, the second clutch C2 and the third clutch C3 are set to be in the connected state.

By setting the two-way clutch F1 to be in the reverse rotation prevention state, normal rotation of the third connected body Ca-Cb is allowed.

Further, by setting the second clutch C2 and the third clutch C3 to be in the connected state, each of the elements of the third planetary gear mechanism PG3 and the fourth planetary gear mechanism PG4 is in a locked state in which the relative rotation is not possible, and the rotational speed of the second connected body Re-Sb becomes "1" as described for the fourth gear stage. Furthermore, by setting the first clutch C1 to be the connected state, the rotational speed of the third connected body Ca-Cb becomes "1".

As a result, the rotational speeds of the carrier Cb (eleventh element) and the sun gear Sb (twelfth element) of the second planetary gear mechanism PG2 become the same speed of "1", and each of the elements is in the locked state in which relative rotation is not possible.

Additionally, the rotational speed of the ring gear Rb (tenth element) of the second planetary gear mechanism PG2 to which the output member 12 is connected becomes "6th" illustrated in FIG. 3, and the sixth gear stage is established.

When a seventh gear stage is established, the two-way clutch F1 is set to be in the reverse rotation prevention state, the second brake B2 is set to be in the fixed state, and the first clutch C1 and the third clutch C3 are set to be in the connected state.

By setting the two-way clutch F1 to be in the reverse rotation prevention state, normal rotation of the third connected body Ca-Cb is allowed. Further, by setting the second brake B2 to be in the fixed state, the rotational speed of the sun gear Sd (sixth element) of the fourth planetary gear mechanism PG4 becomes "0".

Also, by setting the third clutch C3 to be in the connected state, the rotational speed of the ring gear Rd (fourth element) of the fourth planetary gear mechanism PG4 becomes "1" which is the same speed as the rotational speed of the sun gear Sc (first element) of the third planetary gear mechanism PG3, and the rotational speed of the first connected body Ccl-Cd-Ra including the carrier Cd (fifth element) of the fourth planetary gear mechanism PG4 becomes i/(i+1). Further, by setting the first clutch C1 to be in the connected state, the rotational speed of the third connected body Ca-Cb becomes "1" which is the same speed as the rotational speed of the sun gear Sc (first element) of the third planetary gear mechanism PG3 connected to the input shaft 11.

Additionally, the rotational speed of the ring gear Rb (tenth element) of the second planetary gear mechanism PG2 to which the output member 12 is connected becomes "7th" illustrated in FIG. 3, and the seventh gear stage is established.

When an eighth gear stage is established, the two-way clutch F1 is set to be in the reverse rotation prevention state, the second brake B2 is set to be in the fixed state, and the first clutch C1 and the second clutch C2 are set to be in the connected state.

By setting the two-way clutch F1 to be in the reverse rotation prevention state, normal rotation of the third connected body Ca-Cb is allowed. Further, by setting the second brake B2 to be in the fixed state, the rotational speed of the sun gear Sd (sixth element) of the fourth planetary gear mechanism PG4 becomes "0".

Further, by setting the second clutch C2 to be in the connected state, the rotational speed of the second connected body Re-Sb becomes "0" which is the same speed as the rotational speed of the sun gear Sd (sixth element) of the fourth planetary gear mechanism PG 4. Also, by setting the first clutch C1 to be in the connected state, the rotational speed of the third connected body Ca-Cb becomes "1" which is the same speed as the rotational speed of the sun gear Sc (first element) of the third planetary gear mechanism PG3.

Additionally, the rotational speed of the ring gear Rb (tenth element) of the second planetary gear mechanism PG2 to which the output member 12 is connected becomes "8th" illustrated in FIG. 3, and the eighth gear stage is established.

When a ninth gear stage is established, the two-way clutch F1 is set to be in the reverse rotation prevention state, second brake B2 and the third brake B3 are set to be in the fixed state, and the first clutch C1 is set to be in the connected state.

By setting the two-way clutch F1 to be in the reverse rotation prevention state, normal rotation of the third connected body Ca-Cb is allowed. Further, by setting the second brake B2 to be in the fixed state, the rotational speed of the sun gear Sd (sixth element) of the fourth planetary gear mechanism PG4 becomes "0". Also, by setting the third brake B3 to be in the fixed state, the rotational speed of the ring gear Rd (fourth element) of the fourth planetary gear mechanism PG4 also becomes "0".

Accordingly, the sun gear Sd (sixth element), the carrier Cd (fifth element), and the ring gear Rd (fourth element) of the fourth planetary gear mechanism PG4 are in the locked state in which relative rotation is not possible, and the rotational speed of the first connected body Cc-Cd-Ra including the carrier Cd (fifth element) of the fourth planetary gear mechanism PG4 also becomes "0".

Further, by setting the first clutch C1 to be in the connected state, the rotational speed of the third connected body Ca-Cb becomes "1" which is the same speed as the rotational speed of the sun gear Sc (first element) of the third planetary gear mechanism PG3.

Additionally, the rotational speed of the ring gear Rb (tenth element) of the second planetary gear mechanism PG2 to which the output member 12 is connected becomes "9th" illustrated in FIG. 3, and the ninth gear stage is established.

When a tenth gear stage is established, the two-way clutch F1 is set to be in the reverse rotation prevention state, the third brake B3 is set to be in the fixed state, and the first clutch C1 and the second clutch C2 are set to be in the connected state.

By setting the two-way clutch F1 to be in the reverse rotation prevention state, normal rotation of the third connected body Ca-Cb is allowed. Also, by setting the third brake B3 to be in the fixed state, the rotational speed of the ring gear Rd (fourth element) of the fourth planetary gear mechanism PG4 becomes "0".

Further, by setting the second clutch C2 to be in the connected state, the second connected body Re-Sb and the sun gear Sd (sixth element) of the fourth planetary gear mechanism PG4 rotate at the same speed. Also, by setting the first clutch C1 to be in the connected state, the rotational speed of the third connected body Ca-Cb becomes "1" which is the same speed as the rotational speed of the sun gear Sc (first element) of the third planetary gear mechanism PG3.

Additionally, the rotational speed of the ring gear Rb (tenth element) of the second planetary gear mechanism PG2 to which the output member 12 is connected becomes "10th" illustrated in FIG. 3, and the tenth gear stage is established.

When a reverse gear stage is established, the two-way clutch F1 is set to be in the fixed state (L in FIG. 4), the second brake B2 is set to be in the fixed state, and the third clutch C3 is set to be in the connected state.

By setting the second brake B2 to be in the fixed state and setting the third clutch C3 to be connected state, the rotational speed of the first connected body Cc-Cd-Ra becomes i/(i+1). Further, by setting the two-way clutch F1 to be in the fixed state, the rotational speed of the third connected body Ca-Cb becomes "0".

Additionally, the rotational speed of the ring gear Rb (tenth element) of the second planetary gear mechanism PG2 to which the output member 12 is connected becomes "Rvs" indicating the reverse rotation illustrated in FIG. 3, and the reverse gear stage is established.

Next, a structure with a bearing which is provided inside the automatic transmission 3 will be described with reference to FIG. 5 and FIG. 6. Further, arrows in FIG. 5 indicate flows of lubricating oil as a lubricating fluid.

Figure 5:
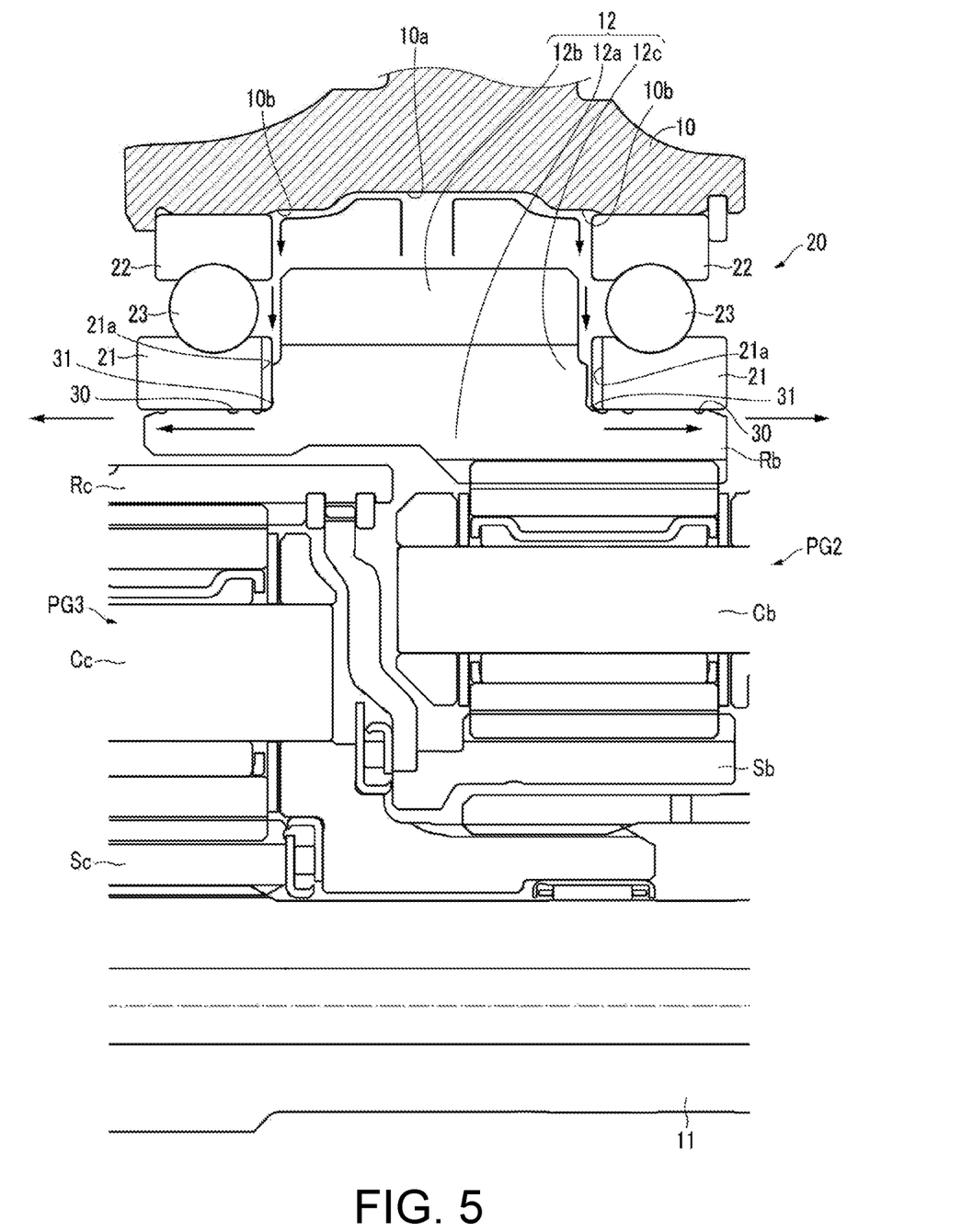
FIG. 5 is an enlarged cross-sectional view illustrating a structure in the vicinity of the structure with a bearing in the transmission of FIG. 2.

As illustrated in FIG. 5, the output member 12 (first member) is pivotally supported by the transmission case 10 (second member) of the automatic transmission 3 via a pair of annular bearings 20 to be rotatable.

The output member 12 is integrally formed with the ring gear Rb of the second planetary gear mechanism PG2. The output member 12 includes a cylindrical base portion 12a connected to the ring gear Rb, a tooth portion 12b located on an outer circumferential side of the base portion 12a, and a protruding portion 12c (wall portion) provided between the base portion 12a and the tooth portion 12b. Both ends of the base portion 12a are in contact with bearings 20, and the tooth portion 12b and the protruding portion 12c are located to be interposed between a pair of bearings 20.

The protruding portion 12c protrudes radially outward along an end surface of the bearing 20, and a gear is formed by the tooth portion 12b and the protruding portion 12c. One end surface (left end surface in FIG. 5) of the two end surfaces of the protruding portion 12c in the axial direction is in contact with the bearing 20 located on the left side in FIG. 5. Further, the other end surface (right end surface in FIG. 5) of the two end surfaces of the protruding portion 12c is located such that there is a gap between it and the bearing 20 located on the right side in FIG. 5.

By rotation of the tooth portion 12b itself, the tooth portion 12b scatters a spray of the lubricating oil splashing in the transmission case 10 or the lubricating oil supplied to the tooth portion 12b and supplies the lubricating oil to a space defined by the pair of bearings 20, the output member 12 and the transmission case 10 and further to a portion in which the output member 12 and the bearing 20 are in contact with each other.

The bearing 20 is a so-called radial bearing and includes a first annular member 21 which is in contact with the cylindrical base portion 12a of the output member 12, a second annular member 22 which is in contact with the transmission case 10, and a rolling body 23 disposed between the first annular member 21 and the second annular member 22.

Further, in the automatic transmission 3, the second annular member 22 is press-fitted to the transmission case 10, and the output member 12 is press-fitted to the first annular member 21. However, it suffices that the first annular member and the second annular member are in contact with the first member and the second member without being displaced in a circumferential direction, and it is not always necessary that the first annular member and the second annular member be press-fitted to the first member and the second member. For example, the first annular member and the second annular member may be loosely fitted to the first member and the second member.

Figure 6:
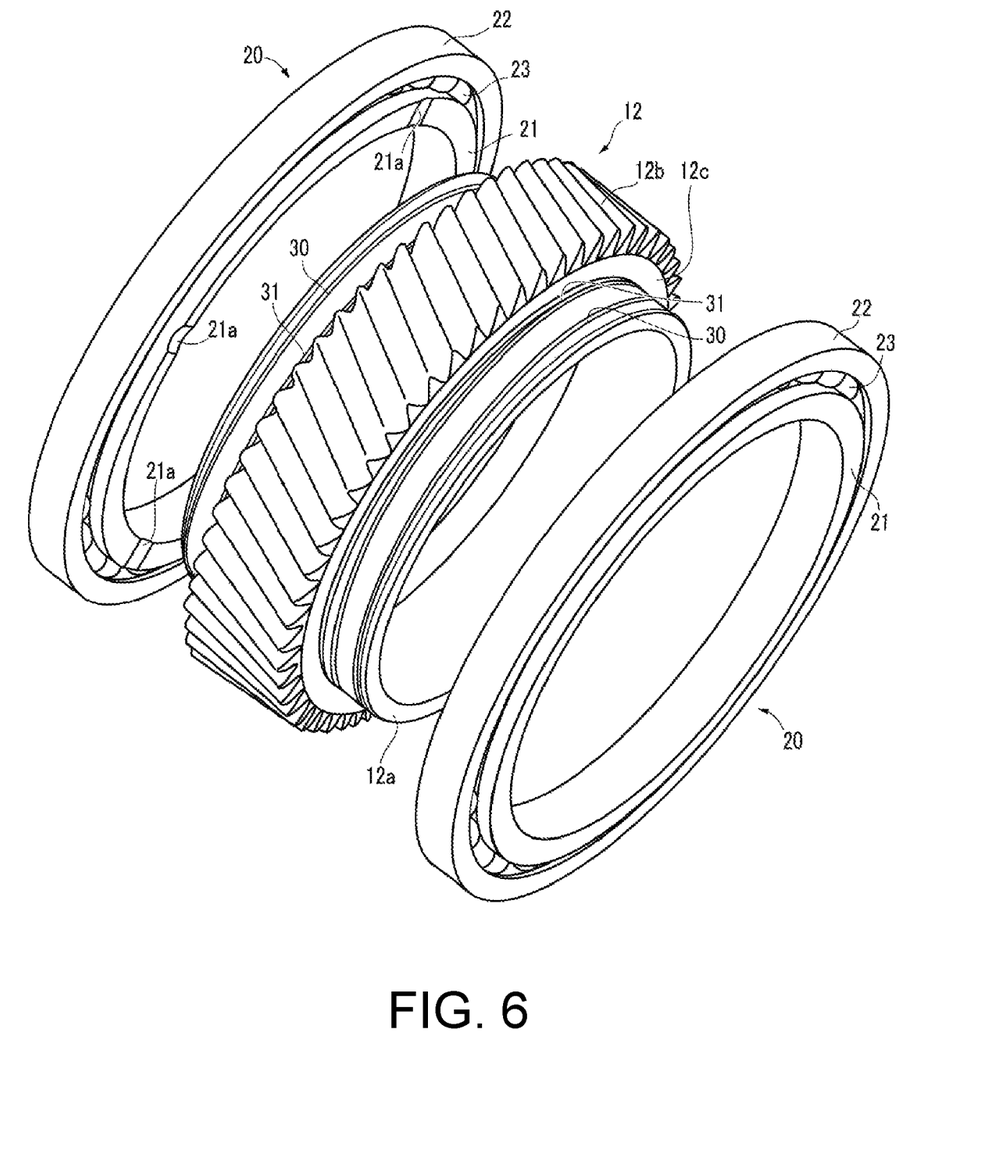
FIG. 6 is an exploded view illustrating the structure with a bearing of FIG. 5.

As illustrated in FIG. 6, the output member 12 has a communication groove 30 in a portion which is in contact with the first annular member 21 of the bearing 20. The communication groove 30 is formed as a spiral groove extending around a rotational central axial line of the bearing 20 (that is, the first annular member 21).

Further, the communication groove 30 allows a space on the output member 12 side of the bearing 20 (that is, a space defined by the pair of bearings 20, the output member 12 and the transmission case 10) to communicate with a space on an opposite side to the output member 12 side. That is, the communication groove 30 allows two spaces adjacent to both ends of the first annular member 21 to be communicating (refer to FIG. 5).

The output member 12 has an annular groove 31 (first member side flow guiding groove) communicating with the communication groove 30 at a portion thereof corresponding to an edge portion of the first annular member 21 of the bearing 20 on the output member 12 side.

The first annular member 21 of the bearing 20 has a flow guiding groove 21a (refer to FIG. 5) which extends from an end surface thereof on the output member 12 side and communicates with the communication groove 30 when the bearing 20 is fixed to the output member 12. Four flow guiding grooves 21a are formed at intervals of 90 degrees. Also, the number and position of the flow guiding grooves 21a may be appropriately changed according to a position or width of a starting point of the communication groove 30.

Next, a flow of the lubricating oil in the structure with a bearing of the automatic transmission 3 will be described with reference to FIG. 5.

As illustrated by arrows in FIG. 5, the lubricating oil scattered by the rotation of the output member 12 is first received by the transmission case 10 (that is, a ceiling portion 10a (receiving surface) which is a space defined by the pair of bearings 20, the output member 12 and the transmission case 10).

In the ceiling portion 10a, a stepped portion 10b protruding toward the output member 12 side is formed at a position facing the guiding groove 21a of the bearing 20 (that is, a portion in which the output member 12 and an end portion of the bearing 20 on the upstream side in a flowing direction of the lubricating oil are in contact with each other). Therefore, the lubricating oil guided to the ceiling portion 10a flows along a surface of the ceiling portion 10a and falls on a contact portion between the bearing 20 and the output member 12 to return back via the stepped portion 10b.

In the falling lubricating oil, the lubricating oil falling via the stepped portion 10b on the left side in FIG. 5 is guided to four substantially semi-cylindrical spaces formed by the base portion 12a and the annular groove 31 of the output member 12 and the flow guiding groove 21a of the left bearing 20 and accumulates in the spaces.

Meanwhile, the lubricating oil falling via the stepped portion 10b on the right side in FIG. 5 is guided to a substantially annular space formed by the base portion 12a, the protruding portion 12c and the annular groove 31 of the output member 12 and the end surface of the right bearing 20 and the flow guiding groove 21a and accumulates in this space.

Then, the accumulated lubricating oil flows in a direction away from the tooth portion 12h and the protruding portion 12c of the output member 12 inside the communication groove 30 as the output member 12 rotates. Therefore, the lubricating oil is also supplied to a space between the first annular member 21 of the bearing 20 and the output member 12 which are in contact with each other.

According to the structure with a bearing in the automatic transmission 3 having such a configuration, even when relative movement between the output member 12 and the first annular member 21 occurs, a lubricating action of the lubricating oil can act on the portion in which the output member 12 and the first annular member 21 are in contact with each other, and thus abrasion in that portion is minimized.

Although an illustrated embodiment has been described above, the present disclosure is not limited to such an embodiment.

For example, in the above-described embodiment, a radial bearing is adopted as a bearing. However, the bearing of the present disclosure is not limited to a radial bearing and may be an annular bearing disposed between two members which are relatively rotatable. For example, it may be a thrust hearing.

Further, in the embodiment, the communication groove 30 is formed in the output member 12, but the communication groove of the present disclosure may be formed in the bearing. Specifically, for example, in the case of a shape which is the same as that in the above embodiment, the communication groove may be formed in an inner circumferential surface of the first annular member 21 of the bearing 20 or an outer circumferential surface of the second annular member 22.

Further, in the embodiment, the communication groove 30 is formed as a spiral groove. This is to increase a length of the communication groove 30 between the first annular member 21 and the output member 12 and thus to increase an amount of the lubricating oil held in that portion, thereby making it easier to further minimize abrasion.

However, since it suffices that the communication groove of the present disclosure allows the space on the upstream side of the bearing and the space on the downstream side thereof to communicate, it is not always necessary to form the communication groove as a spiral groove. For example, the communication groove may be a groove which is only inclined with respect to the rotational central axial line of the first annular member or a groove which extends parallel to the rotational central axial line.

Further, in the embodiment, to facilitate guiding of the lubricating oil to the communication groove 30, the lubricating oil is guided to the space defined by the base portion 12*a*, the protruding portion 12*c* (wall portion) of the output member 12, the flow guiding groove 21*a* (bearing side flow guiding groove) of the bearing 20 and the annular groove 31 (first member side flow guiding groove) of the output member 12 by the stepped portion 10*b* of the transmission case 10, and the lubricating oil accumulates in the space.

However, in a case in which sufficient lubricating oil can be supplied to the communication groove by other means such as sufficiently increasing the amount of lubricating oil to be supplied, any one or all of the wall portion, the first member side flow guiding groove, the stepped portion, and the bearing side flow guiding groove may be omitted. Also, these may be formed on the opposite side to the output member 12 side rather than on the output member 12 side according to a direction of supply of the lubricating fluid.

Further, in the embodiment, the annular groove 31 which surrounds a circumferential surface of the output member 12 as the first member side flow guiding groove is adopted. However, since the first member side flow guiding groove of the present disclosure may have any shape as long as it can communicate with the communication groove, it may be a shape (for example, a semicircular shape) provided in a certain area of the circumferential surface or a concave shape such as a recess formed on the circumferential surface.

In addition, the lubricating fluid may be directly supplied to the portion in which the first member and the bearing are in contact with each other, and for example, the lubricating fluid may fall directly onto the portion in which the first member and the bearing are in contact with each other or the lubricating oil may be supplied from an in-shaft oil path of the input shaft 11.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A structure comprising:
a first member and a second member which are relatively rotatable; and
an annular bearing disposed between the first member and the second member, wherein a lubricating fluid is supplied to the bearing and the bearing comprises:
a first annular member which is in contact with the first member;
a second annular member which is in contact with the second member; and
a rolling body disposed between the first annular member and the second annular member,
wherein one of the first member and the first annular member has a communication groove at where they contact each other, and the communication groove is configured to allow two spaces adjacent to both ends of the first annular member to communicate with each other,
the first member has a gear adjacent to the bearing,
the second member has a receiving surface configured to receive the lubricating fluid scattered by rotation of the gear, and
the receiving surface has a stepped portion configured to protrude to guide the received lubricating fluid to a space between the gear and the bearing.

2. The structure according to claim 1, wherein:
the first member has a first member side flow guiding groove configured to communicate with the communication groove in a portion corresponding to an edge portion of at least one of both end portions of the bearing.

3. The structure according to claim 1, wherein:
a bearing side flow guiding groove configured to communicate with the communication groove is formed in at least one of both end surfaces of the first annular member of the bearing.

4. The structure according to claim 1, wherein:
the first member has a wall portion configured to protrude along an end surface of the bearing at a position spaced apart from the bearing.

5. The structure according to claim 1, wherein:
the bearing is a radial bearing, and
the communication groove is inclined with respect to a rotational central axial line of the first annular member.

6. The structure according to claim 5, wherein:
the first member has a first member side flow guiding groove configured to communicate with the communication groove in a portion corresponding to an edge portion of at least one of both end portions of the bearing.

7. The structure according to claim 5, wherein:
a bearing side flow guiding groove configured to communicate with the communication groove is formed in at least one of both end surfaces of the first annular member of the bearing.

8. The structure according to claim 5, wherein:
the first member has a wall portion configured to protrude along an end surface of the bearing at a position spaced apart from the bearing.

9. The structure according to claim 5, wherein:
the communication groove is a spiral groove configured to extend around the rotational central axial line of the first annular member.

10. The structure according to claim 9, wherein:
the first member has a first member side flow guiding groove configured to communicate with the communication groove in a portion corresponding to an edge portion of at least one of both end portions of the bearing.

11. The structure according to claim 9, wherein:
a bearing side flow guiding groove configured to communicate with the communication groove is formed in at least one of both end surfaces of the first annular member of the bearing.

12. The structure according to claim 9, wherein:
the first member has a wall portion configured to protrude along an end surface of the bearing at a position spaced apart from the bearing.

13. A bearing disposed between a first member and a second member which are relatively rotatable, comprising:
a first annular member which is in contact with the first member, a second annular member which is in contact with the second member, and a rolling body disposed between the first annular member and the second annular member, and
wherein the first annular member has a communication groove at where they contact each other, and the communication groove is configured to allow two spaces adjacent to both ends of the first annular member to communicate with each other, when being in contact with the first member,
the first member has a gear adjacent to the bearing,
the second member has a receiving surface configured to receive a lubricating fluid scattered by rotation of the gear, and
the receiving surface has a stepped portion configured to protrude to guide the received lubricating fluid to a space between the gear and the bearing.

14. The bearing according to claim 13, wherein:
the communication groove is inclined with respect to a rotational central axial line of the first annular member or is a spiral groove configured to extend around the rotational central axial line of the first annular member, and
the first annular member has a bearing side flow guiding groove configured to extend in a radial direction in at least one of both end surfaces thereof.

15. A structure comprising:
a first member and a second member which are relatively rotatable; and
an annular bearing disposed between the first member and the second member, wherein a lubricating fluid is supplied to the bearing and the bearing comprises:
a first annular member which is in contact with the first member;
a second annular member which is in contact with the second member; and
a rolling body disposed between the first annular member and the second annular member,
wherein one of the first member and the first annular member has a communication groove at where they contact each other, and the communication groove is configured to allow two spaces adjacent to both ends of the first annular member to communicate with each other,
the first member has a first member side flow guiding groove configured to communicate with the communication groove,
the first member has a protruding portion configured to protrude along a side surface of the bearing at a position spaced apart from the bearing,
a tooth portion is formed radially outside the protruding portion,
the tooth portion and the protruding portion are disposed at an inner side in an axial direction of the bearing,
a distance between the tooth portion and the first annular member is greater than a distance between the protruding portion and the first annular member, and
the first member side flow guiding groove is located between a surface of the first member in contact with the first annular member and a surface of the protruding portion facing the first annular member.

* * * * *